United States Patent Office 3,338,105
Patented Aug. 29, 1967

3,338,105
SIGNAL GENERATING APPARATUS
Donald R. Kuelbs, Phoenix, and Charles M. Scott, Jr., Scottsdale, Ariz., assignors to Sperry Rand Corporation, Great Neck, N.Y., a corporation of Delaware
Filed Mar. 24, 1964, Ser. No. 354,349
4 Claims. (Cl. 74—5.6)

The present invention relates to apparatus for providing a signal that is a time function of a displacement signal continuously throughout 360° of angular displacement. The invention is particularly applicable to generating a rate signal from a displacement gyroscope about the yaw axis of an aircraft.

Previously, the derivation of a rate output signal directly from a displacement gyroscope has been limited to gyro gimbal angles of less than 360°. This is because of two things, (1) phase and voltage variations when utilizing an inductive pick-off and (2) the impossibility of winding a potentiometer continuously through 360° or more which would be suitable, for example, when the aircraft is making a number of 360° turns such as when flying in a stacking configuration. The limitation to less than 360° is particularly disadvantageous in an aircraft yaw axis rate control system, for example, when the rate signal is used for stability augmentation.

Other methods of generating rate outputs include rate gyros and accelerometers, both of which are expensive, complex and add undesirable weight. Further, rate gyros generally have threshold problems and low saturation limits while accelerometers require accurate and complex integrators to provide rate signals.

The present invention on the other hand eliminates the need for a rate gyro by providing a rate signal from a displacement gyro. Furthermore, the present invention has no saturation limit, enjoys better reliability, is less expensive and lighter in weight while eliminating the need for an additional gyro.

It is therefore a primary object of the present invention to provide apparatus for generating a time function of a displacement signal continuous through 360° of motion.

It is another object of the present invention to provide apparatus for generating an angular rate signal from a displacement gyro continuous through 360° of motion.

It is an additional object of the present invention to provide apparatus for generating an angular rate signal from a displacement gyro through 360° of motion which is simple, reliable, and inexpensive.

These and other objects of the present invention are accomplished by utilizing dual potentiometers associated with respective rate deriving networks each operative over 180° of motion in which the output of the rate circuits are connected through a switching device to provide an angular rate signal continuous through 360° of motion.

These and other objects of the present invention will become apparent by referring to the drawings in which.

Figure 1:
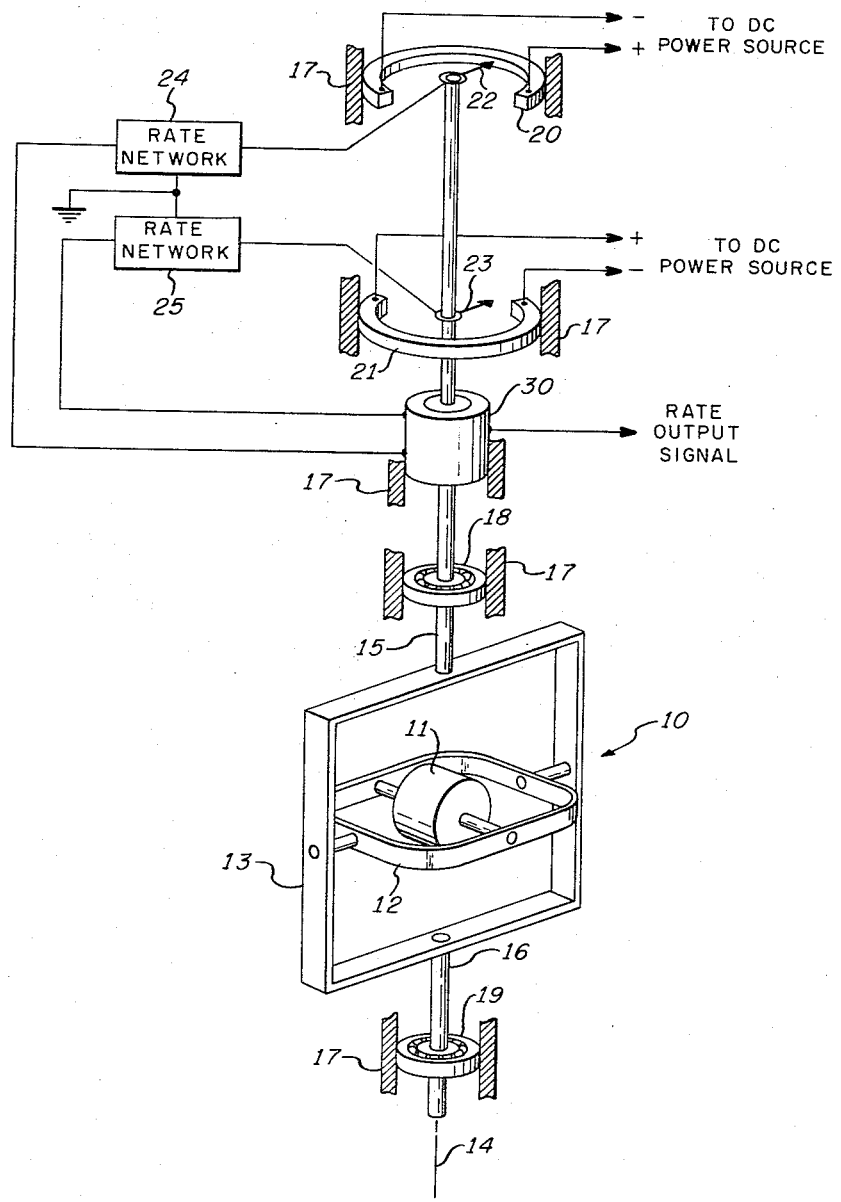
FIG. 1 is a schematic view of a displacement gyroscope utilizing the present invention.

Referring to FIG. 1, a two degree of freedom directional gyro 10 has a spinning rotor 11 supported in an inner gimbal 12 which in turn is rotatably supported in an outer gimbal 13. The outer gimbal 13 is rotatably supported about a vertical axis 14 by means of upper and lower trunnions 15 and 16, respectively, that are cooperative with spaced bearings 18 and 19 disposed in a case or frame 17. The case 17 is mounted on an aircraft in a conventional manner with the vertical axis 14 coincident with or parallel to the yaw axis of the aircraft in order that there is relative rotation between the outer gimbal 13 and the case 17 through 360° of motion about the outer gimbal axis 14.

In accordance with the present invention, two identical arcuately shaped spaced potentiometer windings 20 and 21, respectively, are attached to the case 17 and are wiped by respective wipers 22 and 23. The wipers 22 and 23 are mounted in spaced relation on an extension of the upper trunnion 15 for rotation with the outer gimbal 13. The potentiometer windings 20 and 21 are each continuous through an angle greater than 180° but less than 360° and they are disposed 180° apart with respect to each other while their respective wipers 22 and 23 are aligned with respect to each other in order that each wiper is simultaneously centered on its winding and a proportional signal is available from either and/or both potentiometers for all positions of the outer gimbal 13 with respect to the case 17.

Figure 2:
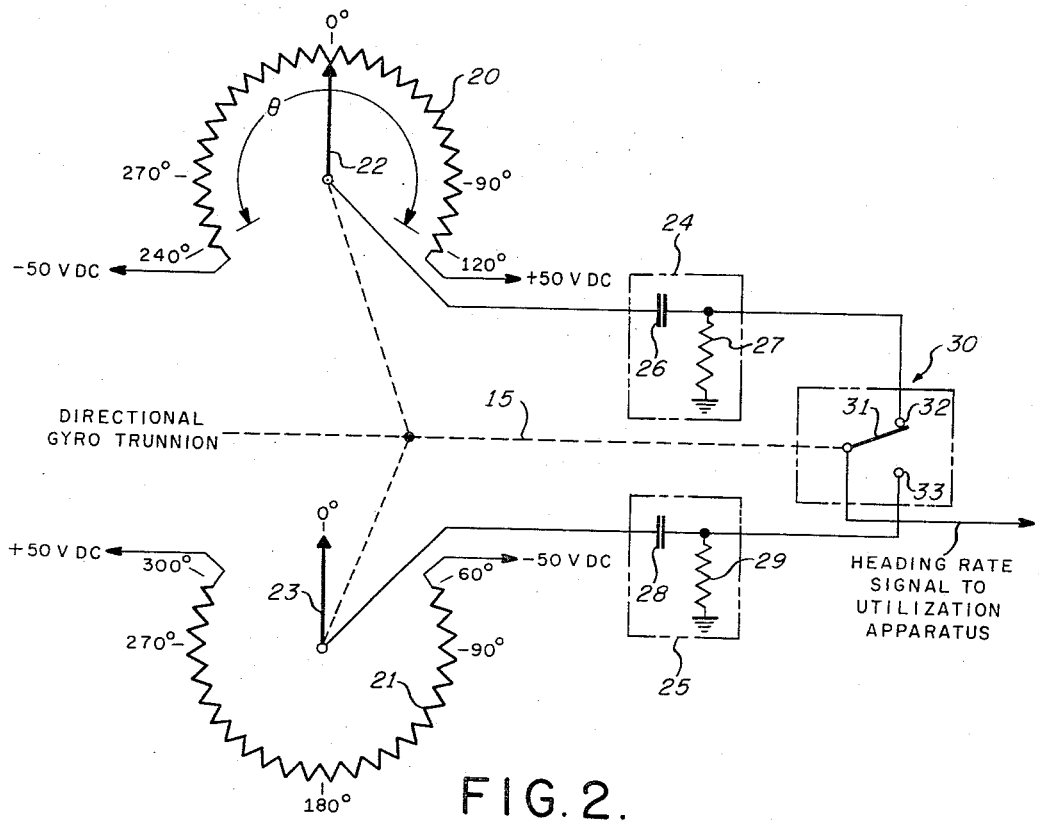
FIG. 2 is a schematic wiring diagram showing the dual potentiometer assembly and rate deriving network of FIG. 1 in detail.

Referring to FIGS. 1 and 2, the potentiometer 20 may be arranged to be effective in the region from 270° to 90° whereas the potentiometer 21 may be arranged to be effective in the region from 90° to 270°. The potentiometer 20 may be energized on its 270° side with —50 volts D.C. and on its 90° side with +50 volts D.C. while potentiometer 21 is energized with —50 volts D.C. on its 90° side and +50 volts D.C. on its 270° side. Each of the potentiometer windings 20 and 21 extend, for example, for an additional 30° beyond each side of their effective operating range.

The wiper 22 is connected to a differentiating or rate deriving RC network 24 while the wiper 23 is connected to an identical differentiating or rate deriving RC network 25. The RC network 24 consists of a series condenser 26 and a parallel resistor 27 while the RC network 25 consists of a series condenser 28 and a parallel resistor 29. The RC networks 24 and 25 are identical and connected to a switching device 30.

Figure 3:
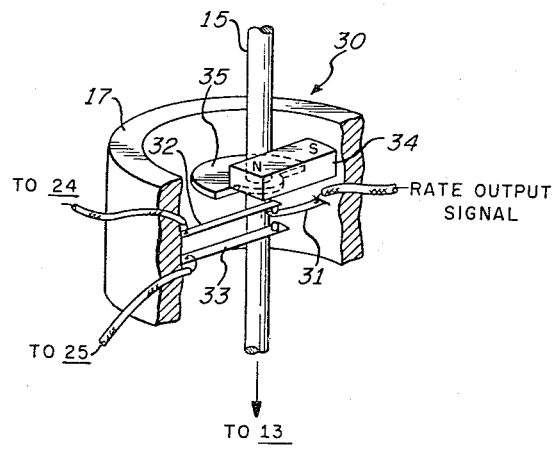
FIG. 3 is a schematic diagram of a switch suitable for use in FIG. 1.

The switching device 30 has one portion connected to the extension of the upper trunnion 15 and another portion connected to the case 17 to switch the output signal from the RC networks 24 and 25 as a function of the relative position of the outer gimbal 13 and the case 17 in order that only one RC network output signal is effective at any one time. An essential feature of the switching device 30 is that it actuates at different outer gimbal angles when approached from the clockwise and counter-clockwise direction. This is necessary to prevent rapid switching, i.e., chattering, when the aircraft yaws through small angles about the switching positions. This may be accomplished through the use of the inherent hysteresis characteristic of a magnetic circuit in which a higher energy level is required for "pull in" than for "drop out." A switch suitable for this purpose is known in FIG. 3 and has a magnetic reed snap switch 31 which operates between contacts 32 and 33. The switching device 30 further includes a permanent magnet 34 and a semi-circular shield 35 for controlling the magnetic field available to actuate the switch 31. The switch 31 and the magnet 34 are fixed to the case 17 while the shield 35 is disposed between the switch 31 and the magnet 34 and is connected to the extension of the upper trunnion 15 for rotation with the outer gimbal 13. Rotation of the shield 35 controls the magnetic field from the magnet 34 available to actuate the switch 31 in a manner to be more fully described with respect to the operation of the present invention.

In operation, as the aircraft turns, the wipers 22 and 23 being aligned with respect to each other move together in a particular direction. The output voltage $E_0$ with respect to ground potential through an RC network will be positive and equal to $E_0 = V/\theta(RC)(\dot{G}_0)$ volts/o/sec., when $V$ = potentiometer excitation
$R$ = total resistance in RC network
$C$ = capacitance
$\dot{G}_0$ = rate of change of outer gimbal angle, i.e. rate of turn exclusive of DG gimbal error
$\theta$ = potentiometer sector angle (>180°)

Referring to FIG. 2, to illustrate the operation of the present invention, assume that the switching device 30 switches at 90° and 270°, the initial heading of the gyro is 0 degrees, and a constant rate of turn in the clockwise direction is initiated. The voltage at the wiper 22 increases linearly from zero. The RC network 24 differentiates this voltage to provide a voltage proportional to the rate of heading change. This voltage is fed to the utilization apparatus indicated by the legend by means of switch 31 which is abutting the contact 32 as shown and remains effective from 0° to 90°.

From 0 degrees to 60 degrees, the wiper 23 is not contacting the winding 21 and therefore provides no voltage to the RC network 25. From 60° to 90°, the wiper 23 is contacting the winding 21 and the voltage at the wiper 23 increases linearly from −50 volts. Since the switch 31 is contacting the contact 32, this transient is not coupled to the utilization apparatus. It will be noted however, from 60° to 90° both RC networks 24 and 25 are discharging at the same rate.

At 90 degrees, the switch 31 switches from contact 32 to contact 33 connecting the utilization apparatus to the RC network 25 thus maintaining a signal input to the utilization apparatus proportional to the rate of heading change without causing transients. The signal from the RC network remains effective from 90° to 270°. At 120 degrees, the output of the wiper 22 drops to zero and remains at zero until a heading of 240 degrees is attained. At 240 degrees, the wiper 22 again contacts the winding 20 and a rate signal is then developed at the RC network 24 so that at 270 degrees when the switch 31 returns to abut contact 32, the rate signal from the RC network 24 will not cause transients to the utilization apparatus.

The output $E_0$ is conversely negative for rates of turn in the counterclockwise direction. Thus it can be seen that for gyro headings of 270 degrees to 90 degrees, the rate signal derived from the wiper 22 and the RC network 24 and from 90 degrees to 270 degrees from the wiper 23 and the RC network 25.

The requirement for hysteresis in the switching action arises when the aircraft is flying on a steady gyro heading of 90 degrees or 270 degrees. With instantaneous switching action, the output signal would be switched between the RC networks 24 and 25 with small perturbations in heading. This would create a noisy signal and result in poor yaw stabilization. The inherent hysteresis in a magnetic switch avoids this undesirable condition.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. Apparatus for generating a signal that is representative of a time function of an angular displacement signal through 360 degrees of motion comprising,
   (1) displacement gyro means having rotatable gimbal shaft means for providing said angular displacement signal,
   (2) first and second substantially identical potentiometers each having arcuate windings of greater than 180 degrees and less than 360 degrees oppositely disposed with respect to each other and oppositely energized and each having aligned wipers operatively connected to said gimbal shaft means and mounted for synchronous rotation therewith through 360 degrees of motion,
   (3) first and second substantially identical function generating means connected to said first and second wipers respectively for providing a predetermined time function of said potentiometer signals, and
   (4) switching means operatively connected to said gimbal shaft means and to said first and second function generating means for rendering the signal from said first function generating means effective through a first portion of the motion of said wipers and for rendering the signal from said second function generating means effective through a second portion of the motion of said wipers.

2. Apparatus for generating a rate signal from an angular displacement signal throughout 360 degrees of motion comprising,
   (1) displacement gyro means having rotatable gimbal shaft means for providing said angular displacement signal,
   (2) first and second substantially identical potentiometers each having arcuate shaped resistive windings extending through more than 180 degrees and less than 360 degrees oppositely energized and disposed with respect to each other and each having respective wipers operatively connected to said gimbal shaft means and aligned with respect to each other and synchronous throughout 360 degrees of motion for providing first and second signals representative of angular displacement through overlapping arcs of greater than 180 degrees and less than 360 degrees respectively,
   (3) first and second rate deriving circuits responsive to said first and second potentiometer displacement signals respectively for providing first and second rate signals representative of the rate of change of said first and second signals, and
   (4) switching means operatively connected to said gimbal shaft means and to said first and second rate circuits for rendering said first rate signal effective through a first 180 degrees of rotation and said second rate signal effective through the remaining 180 degrees of rotation.

3. Apparatus for generating a rate signal from a displacement gyro throughout 360 degrees of motion comprising,
   (1) said displacement gyro means having rotatable gimbal shaft means for providing said angular displacement signal,
   (2) first and second substantially identical potentiometers each having fixed arcuate windings extending through greater than 180 degrees and less than 360 degrees oppositely disposed with respect to each other and oppositely energized and each having first and second aligned wipers operatively connected to said displacement gyro for synchronous rotation with said gimbal shaft means for providing first and second angular displacement signals respectively representative of the movement of said gyro through overlapping arcs of greater than 180 degrees and less than 360 degrees, and
   (3) first and second RC rate circuits responsive to said first and second displacement signals respectively for providing first and second rate signals representative of the rate of change of said first and second displacement signals, and
   (4) switching means operatively connected to said gimbal shaft means and to said first and second RC rate circuits for rendering said first rate signal effective through a first 180 degrees of rotation of said gyro and said second rate signal effective through a second 180 degrees of rotation of said gyro.

4. In apparatus of the character recited in claim 3 in which said switching means includes a magnetic switch having one part mounted for rotation with said gimbal shaft means and the other part fixed in which the magnetic field of said magnetic switch is rendered effective to cause switching at predetermined positions of said gyro, said magnetic switch having a hysteresis characteristic in which a higher energy level is required for pull in than for drop out of said magnetic switch at said predetermined positions whereby rapid switching is prevented when said gyro rotates through small angles about said switching positions.

References Cited
UNITED STATES PATENTS 2,282,726  5/1942  Jones _____ 73—432
2,502,786  4/1950  Hayslett _____ 33—204.66 X FRED C. MATTERN, JR., *Primary Examiner.*
PALMER W. SULLIVAN, *Examiner.*
J. D. PUFFER, *Assistant Examiner.*